F. W. MEYER.
SYSTEM OF CONTROL.
APPLICATION FILED MAR. 24, 1915.

1,227,815.

Patented May 29, 1917.
2 SHEETS—SHEET 1.

WITNESSES:

INVENTOR
Friedrich W. Meyer.
BY
ATTORNEY

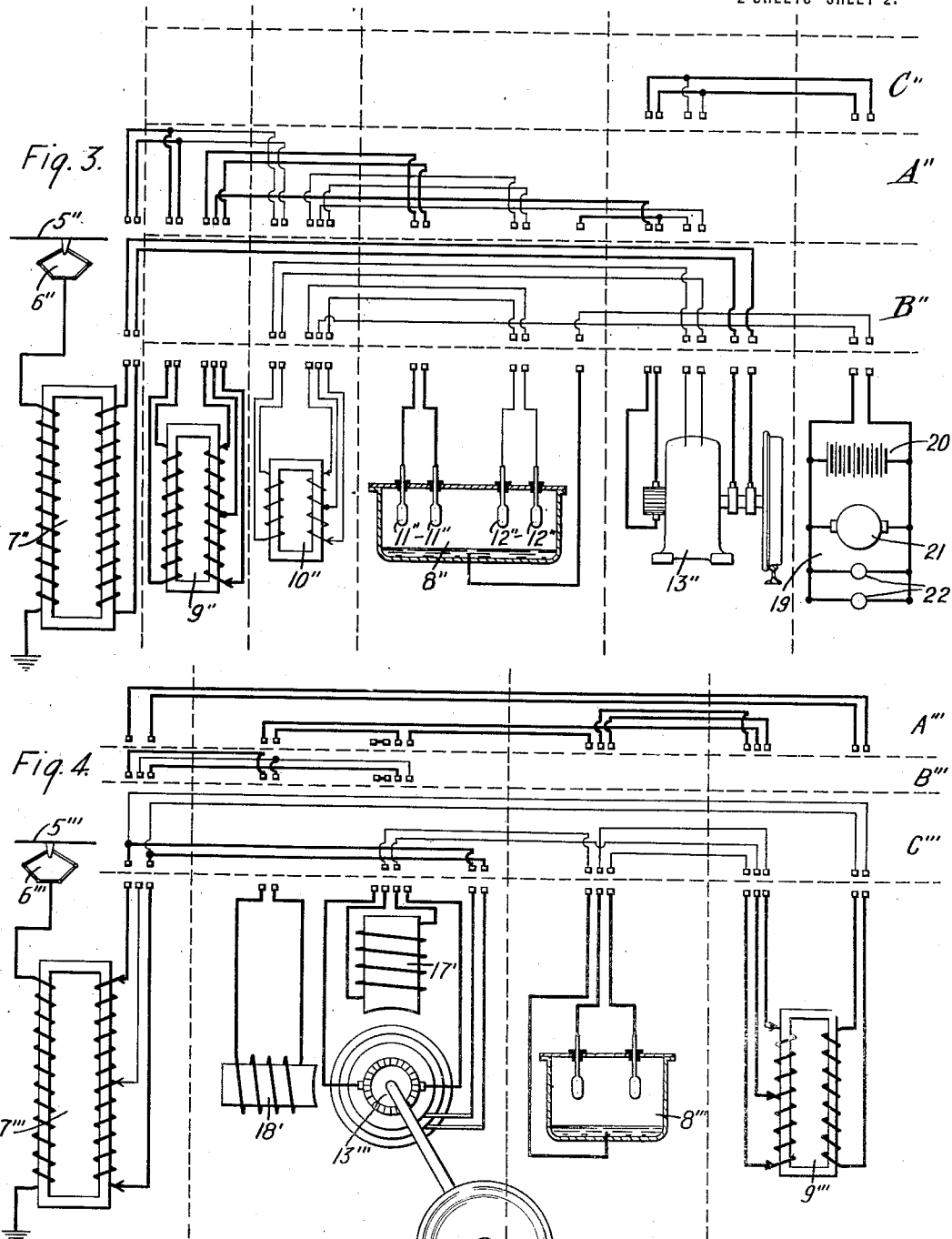

UNITED STATES PATENT OFFICE.

FRIEDRICH W. MEYER, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,227,815.  Specification of Letters Patent.  Patented May 29, 1917.

Application filed March 24, 1915. Serial No. 16,685.

*To all whom it may concern:*

Be it known that I, FRIEDRICH W. MEYER, a subject of the Emperor of Germany, and a resident of Pittsburgh, in the county of Allegheny and State of Pennsylvania, have invented a new and useful Improvement in Systems of Control, of which the following is a specification.

My invention relates to electric railway systems, and it has for its object to provide circuits and apparatus whereby power may be transmitted to a vehicle economically and may there be employed for propulsion in a simple, efficient and flexible manner with great economy of space and weight.

Another object of my invention is to provide means whereby regeneration may be effected in a simple and satisfactory manner.

Figure 1:
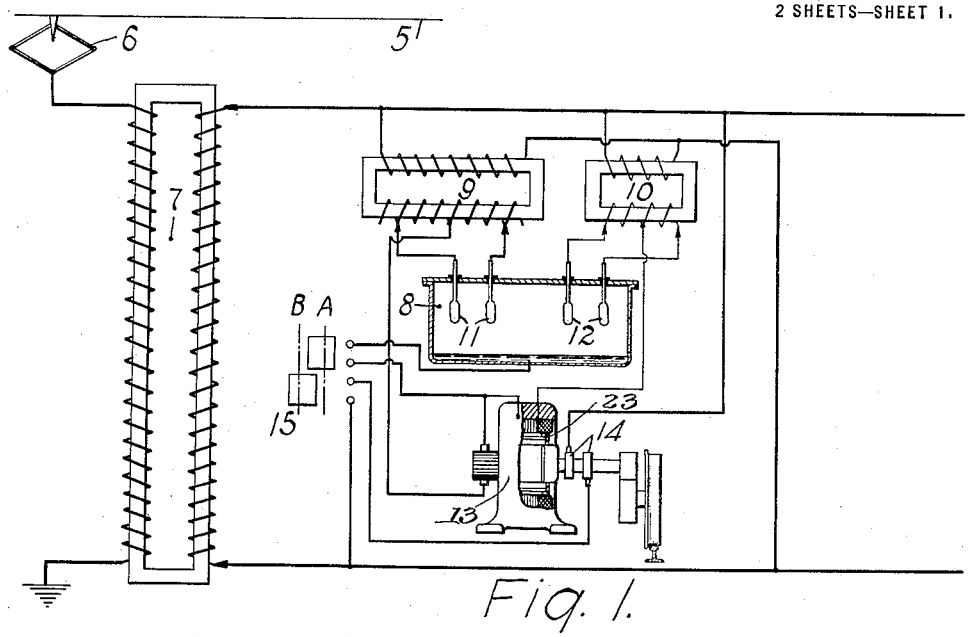
Figure 2:
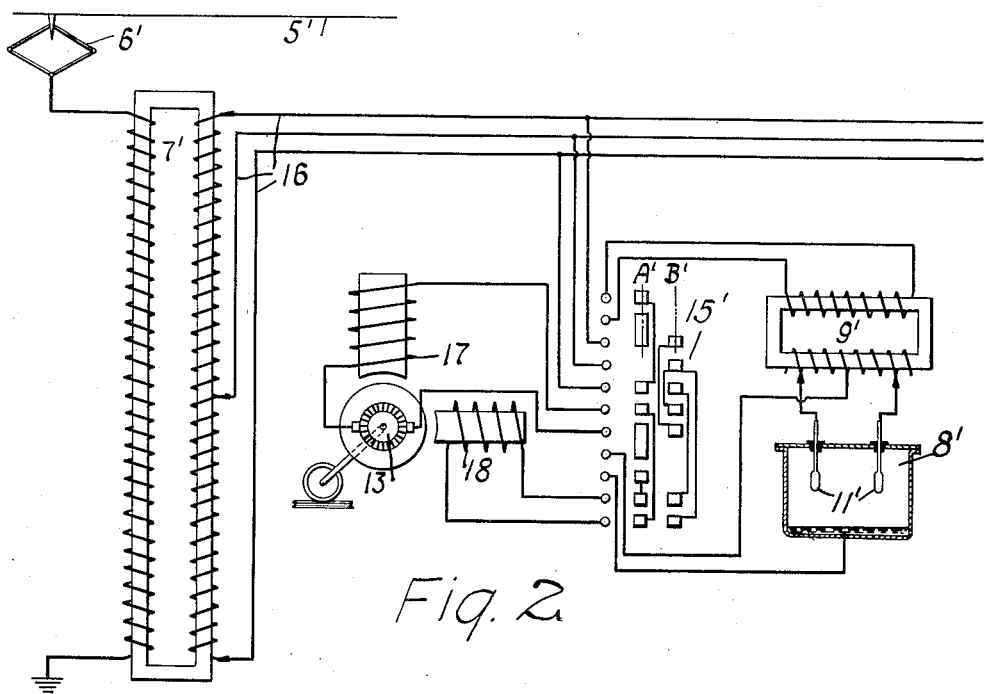

In the accompanying drawings, Figure 1 is a diagrammatic view of the electrical equipment of a railway vehicle embodying one form of my invention; and Figs. 2, 3 and 4 are diagrammatic views of modifications of the system shown in Fig. 1.

In the operation of electric railway systems, it is desirable to employ a single-phase high-voltage line for economy of transmission. No type of single-phase alternating current motor has as yet been developed which is entirely satisfactory for heavy traction work. Neither the synchronous motor nor the single-phase induction motor have suitable starting characteristics for this class of service. The series commutating motor, while somewhat better adapted than the aforementioned types, gives considerable difficulty in commutation unless provided with resistance leads or other devices which add to the size and weight and detract from the efficiency. It has been proposed to provide vehicles of the character described with phase converters of the rotary type for the conversion of the energy of the supply into polyphase form for application to propulsion motors, preferably of the induction type. With this type of installation, a poor power factor is encountered, especially in starting, and somewhat complicated connections are necessary for regeneration. The speed control of the induction motors by adjustable secondary resistance members is highly inefficient. It has also been proposed to equip vehicles of the character described with rectifiers of the vapor-arc type and direct-current propulsion motors. The starting and speed control characteristics of such a system are good but regeneration is difficult because of the non-reversibility of the ordinary rectifier, and, furthermore, the rectifier must be of large size and heat-radiating capacity if used for continuous operation.

In my system, I propose to combine good features from several of the above-mentioned systems by providing an electric railway vehicle with a rectifier of moderate size and with motors adapted to operate on either direct current or alternating current. The alternating-current operation may be of the induction, series commutating or synchronous type, as desired, or it may include combinations of these types. At starting, the motors are provided with direct current through the rectifier, and heavy starting torque with great flexibility of speed and little commutation difficulty is obtained. The rectifier is then eliminated from the circuit and the motors are operated either as induction or synchronous machines for uniform speeds and as series commutating machines for variable speeds. As the rectifier is in circuit only a small portion of the time, it may be of small size and heat-radiating capacity. With any type of alternating current operation, regeneration may be readily effected with comparatively simple circuits. As the series commutating operation is employed at only fairly high speeds, permitting the compensation of the transformer electromotive force in the short circuited coils, but little commutation difficulty is experienced, and the motors need not be equipped with resistance leads as would be the case were they employed in starting in the ordinary manner. The motors will therefore be of substantially the same size and weight as though they were to be employed solely in direct-current operation.

Referring to the drawings for a better understanding of my invention, I show, in Fig. 1, a current-supply conductor 5 energized from any suitable source of single-phase alternating current. Energy derived from the conductor 5 through a suitable contact device 6 is supplied to a vehicle transformer 7 of any desired type. A rectifier 8, preferably of the vapor-arc type, receives energy from the secondary winding of the transformer 7, either directly or through auxiliary transformers 9 and 10, associated, respectively, with pairs and anodes 11—11 and 12—12. A propulsion motor 13 is provided and is adapted for either direct-current or alternating-current operation. This may readily be effected by providing a direct-current motor of the ordinary type with slip rings 14 attached to suitable points in the armature winding and with a fixed squirrel-cage or amortisseur winding 23 associated with the field winding. When a controller 15 is in the position A, direct current from the transformer 9 through the anodes 11—11 is supplied to the armature of the motor 13, and direct current from the transformer 10 through the anodes 12—12 is supplied to the field winding thereof. By suitable independent adjustment of the ratios of transformation in the transformers 9 and 10, the strengths of the field and the armature excitation in the motor 13 may be independently varied, and a positive and flexible control of both speed and torque may be obtained. After the vehicle has been brought up to speed, the controller 15 may be moved to the position B, whereupon the motor 13 is connected directly to the terminals of the secondary winding of the transformer 7 and operates as an induction motor of the rotating armature type. If operation of the motor 13 as a synchronous machine is desired, the direct-current excitation thereof through the transformer 10 and the anodes 12—12 may be maintained. By the adjustment of the ratio of transformation in the transformer 10, the power factor of the line may then be controlled, as is well known in the art. The contact members of the controller 15 preferably overlap, as shown, so that there is a gradual transfer from direct-current operation to alternating-current operation with no harmful results.

Referring to the form of my invention shown in Fig. 2, I show means whereby starting is effected by a direct-current motor and subsequent operation is obtained with said motor operating as a series commutating alternating machine. Current derived from a single-phase line 5' through a contact device 6' is supplied to the vehicle transformer 7' whence energy flows to a controller 15' via three adjustable taps 16. A rectifier 8' is provided with two anodes 11'—11' connected to a suitable adjustable transformer 9'. A motor 13 of the commutating type is provided with a main field winding 17 and with a compensating field winding 18. At starting, the controller 15' is turned to the position A', whereupon energy from the secondary winding of the transformer winding 7' flows through the transformer 9' to the rectifier 8' and is rectified and supplied to all three windings of the motor 13' connected in series, whereby heavy starting torque and sparkless commutation are obtained, as is customary in the ordinary interpole direct-current traction motor. When normal speed has been attained, the controller 15' may be shifted to the position B', whereupon the transformer 9' and the rectifier 8' are eliminated and the motor 13' is connected to the supply as a machine of the doubly-fed series commutating alternating-current type, with the well known operating advantages of this type of apparatus. Speed changes with the alternating-current connection may be obtained by shifting the points of connection of the mains 15 to the secondary winding of the transformer 7'.

Referring to the form of my invention shown in Fig. 3, energy is supplied to a railway vehicle from a line 5" through a contact device 6" and a vehicle transformer 7". The vehicle is also provided with adjustable transformers 9" and 10", with a rectifier 8", a composite motor 13", and an energy-storing and consuming circuit 19. The rectifier 8" is equipped with two sets of anodes 11"—11" and 12"—12". The machine 13" is equipped for operation either as a direct-current motor or as an induction motor, as in Fig. 1. The circuit 19 includes a storage battery 20 and auxiliary apparatus, such, for example, as a blower motor 21 and vehicle lamps 22.

In the operation of the system shown in Fig. 3, three different sets of connections designated, respectively, as A", B" and C", are employed. In normal starting, the connections A" are closed, whereupon alternating current energy from the vehicle transformer 7" is supplied to the primary windings of the transformers 9" and 10" whence it flows through both sets of anodes in the rectifier 8" to the armature and field windings, respectively, of the vehicle motor 13". The motor 13" therefore starts as a direct-current motor, and flexible control of the speed and torque thereof may be obtained by independent adjustment of the ratio of transformation of the transformers 9" and 10", as in the circuit of Fig. 1. When normal speed has been attained, the connections are altered to the form indicated in B", whereupon energy is supplied from the secondary member of the transformer 7" directly to the primary member of the motor 13". The excess energy of the fixed secondary member of the motor 13", in the speed regulation thereof, is transmitted through the transformer 10" and the rectifier 8" to the direct-current energy starting and consumption circuit 19 where it is absorbed. By suitable adjustment of the ratio of transformation of the transformer 10", a wide range of speed variation may be obtained in the motor 13", with but little energy loss.

An additional set of connections C'', may be provided in the control system, whereby energy derived from the storage battery 20 is supplied to both the armature and field winding of the motor 13'' for direct-current operation. This set of connections may be employed for starting, if the battery 20 shows indications of being overcharged, and they may also be employed under abnormal conditions for short periods of time, as, for example, when the power fails on the line 5'' or when it is desired to pick up cars on spur tracks not equipped with a trolley line.

Referring to the form of my invention shown in Fig. 4, energy is supplied to a vehicle transformer 7''' from a single-phase trolley line 5''' through a contact device 6'''. The vehicle is equipped with a propulsion motor 13''' equipped for operation as a direct-current motor, as a doubly-fed series commutating motor, and as a synchronous motor, and therefore provided with a main field winding 17' and with a compensating field winding 18'. The vehicle is also provided with a rectifier 8''' of the -vapor arc type and with an adjustable transformer 9'''. In the control of the vehicle, the connections are first closed, as indicated in the group A''', whereupon energy derived from the secondary member of the transformer 7''' flows through the transformer 9''' and through the rectifier 8''' to the motor 13''' for the direct-current operation of the latter. After considerable speed has been attained, the connections may be altered to the form shown in B''', whereby energy from the transformer 7''' is supplied directly to the motor 13''' and the latter is connected to operate as a doubly-fed series commutating machine. With this connection, a wide range of speed variation may be obtained in any well known manner without serious commutating difficulties. When a certain desired running speed has been attained, the motor 13''' may be connected as shown in the group C''' for synchronous operation. A portion of the energy derived from the transformer 7''' passes directly to the rotor of the machine 13''' and the remainder passes through the transformer 9''', is rectified in the rectifier 8''' and supplied to the main field winding 17' for direct-current excitation.

While I have shown my invention in four distinct embodiments, it will be apparent to those skilled in the art that it is susceptible of various minor changes and modifications without departing from the spirit thereof and I desire, therefore, that no limitations shall be placed thereupon except such as are imposed by the prior art or are specifically set forth in the appended claims.

I claim as my invention:

1. In an electric distributing system, the combination with a single-phase alternating current source of supply, of a motor adapted to operate on either direct current or alternating current, a rectifying device, and connections whereby, at starting, said motor is supplied with direct current through said rectifying device and whereby it is subsequently supplied with alternating current from said source for operation as an induction motor, an auxiliary consumption circuit, and means operative in conjunction with said rectifying device whereby energy derived from the secondary member of said motor, in the speed regulation thereof, may be employed for the energization of said consumption circuit.

2. In an alternating-current distributing system, the combination with a source of alternating current, of a motor adapted for operation either as a direct-current motor or as an induction motor, a rectifying device, and control means whereby, at starting, said rectifier is connected between said source and said motor for the energization thereof with direct current and whereby, during subsequent operation, said motor is connected to said source for induction-motor operation and said rectifier is connected to the secondary member thereof for speed control.

In testimony whereof, I have hereunto subscribed my name this 12th day of May, 1915.

FRIEDRICH W. MEYER.

Witnesses:
D. C. DAVIS,
B. B. HINES.